United States Patent
Beard et al.

(10) Patent No.: US 11,442,782 B2
(45) Date of Patent: Sep. 13, 2022

(54) RESOURCE ACCESS

(71) Applicant: Nokia Technologies Oy, Espoo (FI)

(72) Inventors: Timothy Giles Beard, Cambridge (GB); Christopher John Wright, Lausanne (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 112 days.

(21) Appl. No.: 16/887,628

(22) Filed: May 29, 2020

(65) Prior Publication Data
US 2020/0387403 A1 Dec. 10, 2020

(30) Foreign Application Priority Data

Jun. 10, 2019 (EP) .................................. 19179267

(51) Int. Cl.
*G06F 9/50* (2006.01)
*G06F 9/48* (2006.01)
(Continued)

(52) U.S. Cl.
CPC ............ *G06F 9/5038* (2013.01); *G06F 3/013* (2013.01); *G06F 9/4843* (2013.01); *G06F 21/62* (2013.01);
(Continued)

(58) Field of Classification Search
CPC .. G06F 21/32; G06F 21/62; G06F 2221/2137; G06F 2221/2141; G06F 3/013;
(Continued)

(56) References Cited

U.S. PATENT DOCUMENTS 9,454,225 B2 9/2016 Bychkov et al.
2009/0113294 A1* 4/2009 Sanghavi .............. G06F 40/103
715/269

(Continued)

FOREIGN PATENT DOCUMENTS

WO 2013/085652 A2 6/2013
WO 2015/182032 A1 12/2015

OTHER PUBLICATIONS

Su et al., "Activity Recognition with Smartphone Sensors", Tsinghua Science and Technology, vol. 19, No. 3, Jun. 2014, pp. 235-249.
(Continued)

*Primary Examiner* — Jorge A Chu Joy-Davila
(74) *Attorney, Agent, or Firm* — Alston & Bird LLP

(57) ABSTRACT

An apparatus comprising means for performing: at a first time, controlling whether a user is granted access to a resource based on a response of the user to a first access task, and setting one or more restrictions on granted access to the resource based on the response of the user to the first access task; at a second time, controlling whether the user is granted access to the resource based on a response of the user to a second access task, different to the first access task, and setting one or more restrictions on granted access to the resource based on the response of the user to the second access task; and initiating a change from the first access task to the second access task, wherein the initiation of the change is causally independent of the response of the user to the first access task.

17 Claims, 5 Drawing Sheets

(51) Int. Cl.
*G06F 3/01* (2006.01)
*G06F 21/62* (2013.01)
*G06K 9/62* (2022.01)

(52) U.S. Cl.
CPC .... *G06K 9/6215* (2013.01); *G06F 2221/2141* (2013.01)

(58) Field of Classification Search
CPC ... G06F 9/4843; G06F 9/5038; G06K 9/6215; G06N 20/10; G06N 3/08; G06N 7/005; H04L 63/08; H04L 63/105
See application file for complete search history.

(56) References Cited

U.S. PATENT DOCUMENTS

| | | | |
|---|---|---|---|
| 2013/0307764 | A1 | 11/2013 | Denker et al. |
| 2015/0033305 | A1* | 1/2015 | Shear ............... G06F 21/53 726/11 |
| 2015/0227735 | A1* | 8/2015 | Chappell ............. G06F 3/013 726/19 |
| 2016/0378201 | A1 | 12/2016 | Baughman et al. |
| 2017/0032137 | A1* | 2/2017 | Landqvist ........... G06K 9/0061 |
| 2017/0163647 | A1* | 6/2017 | Cernoch .............. G06F 21/44 |
| 2017/0168703 | A1 | 6/2017 | Feris et al. |
| 2017/0180348 | A1* | 6/2017 | Piccolotto .......... G06V 40/45 |
| 2017/0185760 | A1* | 6/2017 | Wilder .............. G06K 9/00906 |
| 2017/0249855 | A1* | 8/2017 | Gazzaley ........... A61B 5/375 |
| 2017/0318019 | A1 | 11/2017 | Gordon et al. |
| 2017/0346817 | A1* | 11/2017 | Gordon ............. G06V 40/10 |
| 2018/0114001 | A1* | 4/2018 | Jain ................. G06F 21/31 |
| 2018/0196930 | A1* | 7/2018 | Ahuja ............... G06F 21/32 |
| 2020/0042681 | A1* | 2/2020 | Benkreira .......... H04L 63/102 |
| 2020/0121237 | A1* | 4/2020 | Yellin .............. A61B 3/113 |

OTHER PUBLICATIONS

Likamwa et al., "RedEye: Analog ConvNet Image Sensor Architecture for Continuous Mobile Vision", 43rd Annual International Symposium on Computer Architecture, Jun. 18-22, 2016, pp. 255-266.

Eichler, "Towards Multimodal Adaptive User Interfaces", Ph D. Thesis Proposal, Masaryk University, Faculty of Informatics, Jan. 2014, 38 pages.

Hussain et al., "Model-Based Adaptive User Interface Based on Context and User Experience Evaluation", J Multimodal User Interfaces, vol. 12, Feb. 1, 2018, 16 pages.

"The Psychosocial Toll Of Our Increasingly Online Lives", ScienceBlog, Retrieved on May 28, 2020, Webpage available at : scienceblog.com/501347/the-psychosocial-toll-of-our-increasingly-online-lives/.

"How the biggest names in mobile are trying to curb smartphone addiction", New Atlas, Retrieved on May 28, 2020, Webpage available at: newatlas.com/apple-google-smartphone-addiction/55397/.

Reingold et al., "Cognitive control of fixation duration in visual search: The role of extrafoveal processing", Visual Cognition, vol. 22, Nos. 3-4, 2014, pp. 610-634.

Wu et al., "The Capacity of Cognitive Control Estimated from a Perceptual Decision Making Task", Scientific Reports, vol. 6, No. 34025, Sep. 23, 2016, pp. 1-11.

"Watch: Apple developer controlling iPhone X using eye-tracking", Gadgets Now, Retrieved on May 28, 2020, Webpage available at : gadgetsnow.com/mobiles/watch-apple-developer-controlling-iphone-x-using-eye-tracking/articleshow/64514593.cms.

"Did eye just do that? Microsoft brings gaze tracking to Windows 10", The Register, Retrieved on May 28, 2020, Webpage available at : theregister.co.uk/2017/08/02/microsoft_to_bring_eye_control_to_windows_10/.

Ma et al., "Daily Mood Assessment based on Mobile Phone Sensing", Ninth International Conference on Wearable and Implantable Body Sensor Networks, 2012, pp. 142-147.

"A particular type of smartphone use is linked to everyday inattention", PsyPost, Retrieved on May 28, 2020, Webpage available at : psypost.org/2018/07/a-particular-type-of-smartphone-use-is-linked-to-everyday-inattention-51826.

5 Ways to Counteract Your Smartphone Addiction, Harvard Business Review, Retrieved on May 28, 2020, Webpage available at : hbr.org/2018/03/5-ways-to-counteract-your-smartphone-addiction.

"Investors want Apple to do more to fight kids' smartphone addiction", USA Today, Retrieved on May 29, 2020, Webpage available at: www.usatoday.com/story/tech/2018/01/08/investors-urge-apple-do-more-combat-iphone-addiction-among-kids/1012149001/.

Extended European Search Report received for corresponding European Patent Application No. 19179267.0, dated Nov. 27, 2019, 9 pages.

* cited by examiner

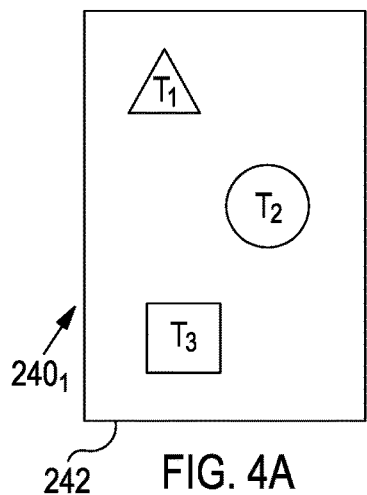 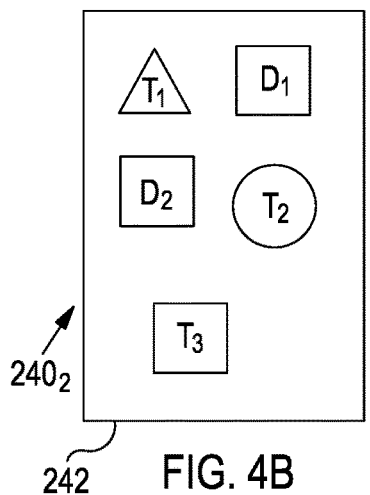 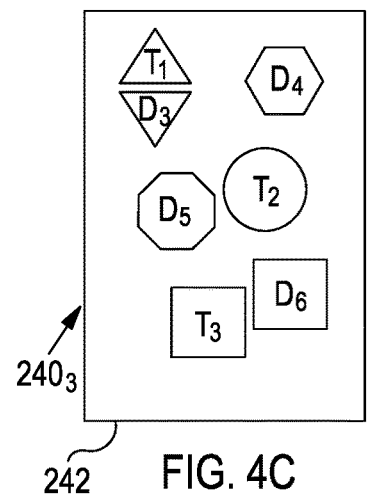
FIG. 4A   FIG. 4B   FIG. 4C
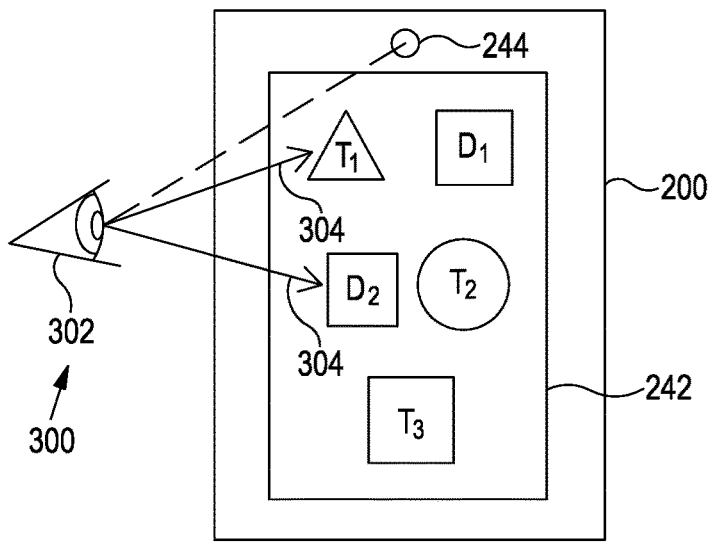
FIG. 5
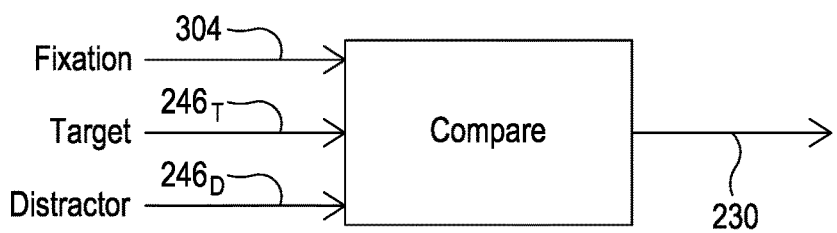
FIG. 6

RESOURCE ACCESS

TECHNOLOGICAL FIELD

Embodiments of the present disclosure relate to resource access. Some relate to controlling access for a user to at least one resource based on a response of the user to an access task.

BACKGROUND

Access tasks protect access to resources. The access tasks are used to decide whether to grant or deny a user access to resources. Access to resources is granted if the access tasks are completed by a user and access to the same resources is denied if the same access tasks are failed by the user.

Examples of access tasks include PIN-based device-unlock tasks or facial recognition-based device-unlock tasks.

Resources which are protected by access tasks include system resources such as system software and hardware controlled and operated by the system software and also include application software resources such as productivity software, entertainment software, social software, etc. and their respective constituent functions, processes and threads.

BRIEF SUMMARY

According to various, but not necessarily all, embodiments there is provided an apparatus comprising means for: at a first time, controlling whether or not a user is granted access to at least one resource based on an obtained response of the user to a first access task; at the first time, setting one or more restrictions on granted access to the at least one resource based on the obtained response of the user to the first access task; at a second time, controlling whether or not the user is granted access to the at least one resource based on an obtained response of the user to a second access task, different to the first access task; at the second time setting one or more restrictions on granted access to the at least one resource based on the obtained response of the user to the second access task; and initiating a change from the first access task to the second access task, wherein the initiation of the change is causally independent of the obtained response of the user to the first access task.

The apparatus may be configured as a device and comprise: the at least one resource; means for rendering the access task to the user; and means for obtaining the response of the user to the first and/or second access task.

According to various, but not necessarily all, embodiments there is provided an apparatus comprising at least one processor and at least one memory, including computer program code. The at least one memory and the computer program code are configured to, with the at least one processor, cause the apparatus at least to perform: at a first time, controlling whether or not a user is granted access to at least one resource based on an obtained response of the user to a first access task; at the first time, setting one or more restrictions on granted access to the at least one resource based on the obtained response of the user to the first access task; at a second time, controlling whether or not the user is granted access to the at least one resource based on an obtained response of the user to a second access task, different to the first access task; at the second time setting one or more restrictions on granted access to the at least one resource based on the obtained response of the user to the second access task; and initiating a change from the first access task to the second access task, wherein the initiation of the change is causally independent of the obtained response of the user to the first access task.

According to various, but not necessarily all, embodiments there is provided a method comprising: at a first time, controlling whether or not a user is granted access to at least one resource based on an obtained response of the user to a first access task; at the first time, setting one or more restrictions on granted access to the at least one resource based on the obtained response of the user to the first access task; at a second time, controlling whether or not the user is granted access to the at least one resource based on an obtained response of the user to a second access task, different to the first access task; at the second time setting one or more restrictions on granted access to the at least one resource based on the obtained response of the user to the second access task; and automatically initiating a change from the first access task to the second access task, wherein the initiation of the change is causally independent of the obtained response of the user to the first access task.

According to various, but not necessarily all, embodiments there is provided a computer program that, when run on a computer, performs: at a first time, controlling whether or not a user is granted access to at least one resource based on an obtained response of the user to a first access task; at the first time, setting one or more restrictions on granted access to the at least one resource based on the obtained response of the user to the first access task; at a second time, controlling whether or not the user is granted access to the at least one resource based on an obtained response of the user to a second access task, different to the first access task; at the second time setting one or more restrictions on granted access to the at least one resource based on the obtained response of the user to the second access task; and initiating a change from the first access task to the second access task, wherein the initiation of the change is causally independent of the obtained response of the user to the first access task.

According to various, but not necessarily all, embodiments there is provided a non-transitory computer readable medium, computer product, or machine readable medium, comprising instructions stored thereon for performing at least the following: at a first time, controlling whether or not a user is granted access to at least one resource based on an obtained response of the user to a first access task; at the first time, setting one or more restrictions on granted access to the at least one resource based on the obtained response of the user to the first access task; at a second time, controlling whether or not the user is granted access to the at least one resource based on an obtained response of the user to a second access task, different to the first access task; at the second time setting one or more restrictions on granted access to the at least one resource based on the obtained response of the user to the second access task; and initiating a change from the first access task to the second access task, wherein the initiation of the change is causally independent of the obtained response of the user to the first access task.

The following portion of this 'Brief Summary' section, describes various features that may be features of any of the embodiments described in the foregoing portion of the 'Brief Summary' section. The description of a function should additionally be considered to also disclose any means suitable for performing that function.

Setting one or more restrictions on granted access may comprise controlling one or more permissions of the at least one resource to at least one system resource via which the user can interact with the at least one resource.

Setting one or more restrictions on granted access may comprise granting access for the user to at least one of a plurality of resources and denying access for the user to at least one other of the plurality of resources.

Setting one or more restrictions on granted access to the at least one resource may comprise setting a time limit on the granted access.

Setting one or more restrictions on granted access to the at least one resource may comprise controlling settings of at least one system resource via which the user can interact with the at least one resource.

The first and second access task may comprise rendering one or more target elements rendered to the user for identification by the user.

In some, but not necessarily all, examples the first access task differs from the second access task in respect of one or more distractor elements rendered to the user.

The change from the first access task to the second access task may comprise changing one or more of: a ratio; a proximity; a similarity; or a relative movement, of the one or more distractor elements to the one or more target elements.

The means may be configured to: obtain gaze-tracking data of the user; and determine when a fixation position of a gaze of the user matches a rendered position of the one or more target elements, wherein the obtained response of the user to the first and/or second access task is based on a duration and/or frequency of the fixation position of the gaze of the user matching the rendered position of the one or more target elements.

The means may be configured to: prevent access to the at least one resource if the determined response of the user is within a first class of responses; set first one or more restrictions on granted access to the at least one resource if the determined response of the user is within a second class of responses; and set second one or more restrictions, different to the first restrictions, on granted access to the at least one resource if the measured response of the user is within a third class of responses.

The means may be configured to: classify the obtained response of the user to the first and/or second access task; control whether or not a user is granted access to at least one resource based on a classification of the determined response of the user; and set one or more restrictions on granted access to the at least one resource based on the classification of the determined response of the user.

The initiation of the change from the first access task to the second access task may be causally dependent on a change, occurring between the first and second times, in one or more values of one or more monitored parameters which vary with actions of the user.

The means may be configured to: obtain an expected usage of the at least one resource at the first time and at the second time based on the one or more values of the one or more monitored parameters at the first and second time respectively; and initiate the change from the first access task to the second access task if the expected usage at the second time is different to the expected usage at the first time.

According to various, but not necessarily all, embodiments there is provided examples as claimed in the appended claims.

BRIEF DESCRIPTION

Some examples will now be described with reference to the accompanying drawings in which:

FIGS. 4A to 4C show examples of access tasks as described herein;

FIG. 5 shows an example of gaze tracking as described herein;

FIG. 6 shows an example of obtaining a response of the user to an access task as described herein;

DETAILED DESCRIPTION

Figure 1:
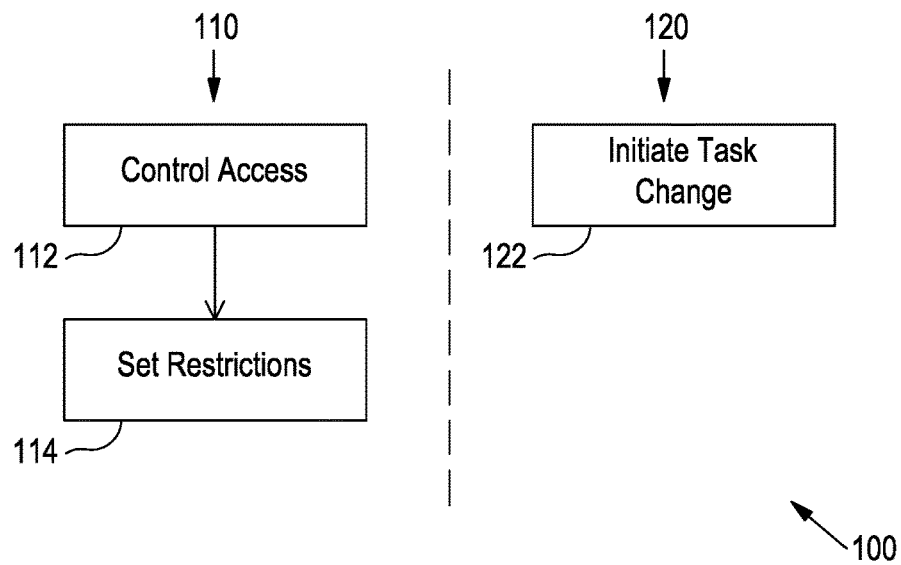
FIG. 1 shows an example of a method as described herein.
Figure 3:
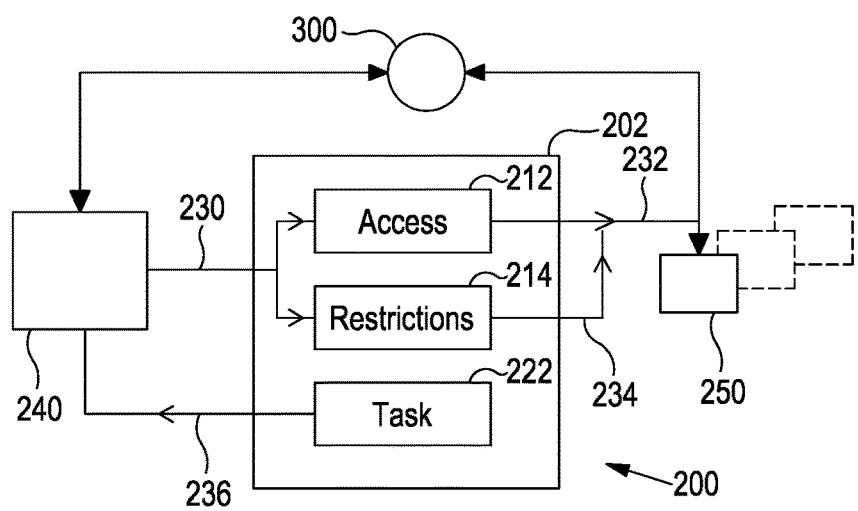
FIG. 3 shows an example of an apparatus as described herein.

FIG. 1 illustrates a method 100 for controlling access for a user to one or more resources 250 (as first illustrated in FIG. 3). These resources 250 can comprise: system resources including system software and hardware controlled and operated by the system software; and application software resources including productivity software, entertainment software, social software, etc. and their respective constituent functions, processes and threads. Access to these resources 250 can be granted or denied. When granted access, a user can interact with the resources 250. When denied access, a user cannot operate or control the resources 250.

The method 100 comprises a first sub-method 110 for controlling access based on a response of the user to an access task 240 (as first illustrated in FIG. 3) and a second sub-method 120 for initiating changes to the access task 240 such that a user is faced with different access tasks 240 at different times. The two sub-methods 110, 120 are causally independent in that the initiation of changes to the access task 240 is causally independent of the response of the user to a prior access task 240 and thus also causally independent of the resulting control of access for the user to the one or more resources 250.

The first sub-method 110 comprises, at block 112, controlling whether or not a user is granted access to at least one resource 250 based on an obtained response of the user to an access task 240. The first sub-method 110 then comprises, at block 114, setting one or more restrictions on granted access to the at least one resource 250 based on the obtained response of the user to the access task 240.

The obtained response of the user to the access task 240 may be received from a device for measuring the response, or determined by processing data received from a device for measuring the response, or determined from measurements of the response.

The response of the user to the access task 240 is indicative of the cognitive control state of the user. Cognitive control state relates to a person's ability to resist distraction or mind wandering events. Thus, for example, the time for the user to complete the access task 240 is indicative of their distractibility during the access task 240 and thus their cognitive control state can be estimated accordingly. For example, if the time taken for the user to complete the access task 240 differs by a statistically significant margin from a statistical average time for the user to complete the access task 240 or comparable access task (for example, in terms of complexity), this can be attributed to a higher or lower cognitive control state of the user than usual during the access task 240.

The use of certain resources 250, such as for example social software, while in a lowered cognitive control state makes users vulnerable to technical measures employed by these resources 250 to gain the attention of the user and to distract them from other activities. This leads to an increase in the time spent interacting with these resources 250. Increases in the time spent interacting with these resources 250 can have a detrimental effect on the mental well-being of the user, a direct detrimental effect on the physical well-being of the user such as eye strain or repetitive strain injury (RSI), and a detrimental effect on the power consumption of the device via which the user interacts with these resources 250. Setting one or more restrictions on granted access, as per block 114 of the first sub-method 110, is a countermeasure against the technical measures employed by these resources 250, thus reducing the time spent interacting with these resources 250 and ameliorating the aforementioned detrimental effects.

The second sub-method 120 comprises, at block 122, initiating a change in the access task 240, from a first access task to a second, different access task. Therefore, at a first time the controlling of whether a user is granted access to at least one resource 250 and the setting of one or more restrictions on the granted access, as per blocks 112 and 114 of the first sub-method 110 respectively, are based on a response of the user to the first access task and at a second time they are based on a response of the user to the second, different access task.

The initiation of this change is causally independent of the obtained response of the user to the first access task. For example, if the user fails to complete an access task 240 at the first time, this does not initiate a change to the access task 240. To illustrate this point further it is to be appreciated that where the initiation of a change in the access task 240 is causally dependent on the response of the user to the access task 240 (contrary to block 122 of the method 100), the failure of the user to complete an access task 240 at the first time may trigger the change of the access task 240. An example of such causal dependence is the switching from a facial recognition-based device-unlock task to a PIN-based device-unlock task at least in part in response to failure of the facial recognition-based device-unlock task.

The change is not initiated by the user. For example, the change is not initiated by the user manually adjusting setting relating to the access task 240 in the interval between the first and second times so that at the second time they are faced with a different access task 240. The change is initiated by a machine and the change is thus automatically initiated. In some examples, the machine autonomously initiates the change.

In some examples the initiation of the change in the access task 240 is causally dependent on a change, occurring between the first and second times, in one or more values of one or more monitored parameters which vary with actions of the user. Examples of such monitored parameters include, without limitation:
  a time-of-day at which the user seeks access to the at least one resource 250 via the access task 240;
  a real-world location from where the user seeks access to the at least one resource 250 via the access task 240; and
  biometric parameters indicative of the mood or behavior of the user such as facial expression, heart rate, and breathing rate.

The initiation of the change in the access task 240 may not be responsive to just any change in the one or more values of the one or more monitored parameters. In some examples, the initiation of the change in the access task 240 is responsive to a determination that the aforementioned change the one or more values of the one or more monitored parameters represents a change in an expected usage of the at least one resource 250 to which the user seeks access.

Thus, the method 100 can comprise obtaining an expected usage of the at least one resource 250 at a first time and at a second time based on the values of the one or more monitored parameters at the first and second time respectively. In this example the method 100 comprises initiation of a change, in accordance with block 122, from the first access task to the second access task if the expected usage at the second time is different to the expected usage at the first time.

Figure 2:
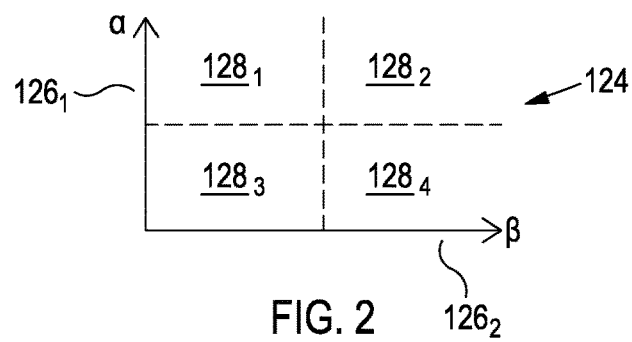
FIG. 2 shows an example of different expected usages as described herein.

FIG. 2 schematically illustrates a parameter space 124 which is defined by these one or more monitored parameters $\alpha$, $\beta$ which vary with actions of the user. Each dimension $126_1$, $126_2$ of the parameter space 124 is represented by one of the monitored parameters $\alpha$, $\beta$. Although the parameter space 124 is only illustrated in two dimensions $126_1$, $126_2$ in FIG. 2 it is to be appreciated that the parameter space 124 may be one-dimensional or multi-dimensional with the number of dimensions corresponding to the number of monitored parameters $\alpha$, $\beta$. Thus, the parameter space 124 is spanned by the monitored parameters $\alpha$, $\beta$.

In this example the parameter space 124 is divided into a plurality of defined subspaces $128_1$, $128_2$, $128_3$, $128_4$, each associated with a different expected usage of the at least one resource 250 to which the user seeks access. Thus, if values of the monitored parameters $\alpha$, $\beta$ describe a point with a subspace, those values are indicative of the expected usage associated with that particular subspace. Determining that a change in the one or more values of the one or more monitored parameters $\alpha$, $\beta$ represents a change in the expected usage between the first and second times therefore comprises determining if the values of those monitored parameters $\alpha$, $\beta$ at the second time describe a point which is within a different subspace to a point described by the values of those monitored parameters $\alpha$, $\beta$ at the first time.

In some examples the definition of the subspaces $128_1$, $128_2$, $128_3$, $128_4$ associated with different expected usage is determinative, according to a set of rules (or a specified algorithm) which define boundaries in respect of particular monitored parameters $\alpha$, $\beta$. These rules may be personalized by the user. For example, the user may specify his work hours, during which their expected usage of the at least one resource is for work purposes, and his free time, during which their expected usage of the at least one resource is for leisure purposes. The rules may be adapted to a user-specified itinerary.

In other examples, the definition of the subspaces $128_1$, $128_2$, $128_3$, $128_4$ associated with different expected usage is controlled by machine learning (or an unspecified algorithm).

The machine learning may be supervised, such as classification in the parameter space 124 using training data which correlates previous values of the monitored parameters $\alpha$, $\beta$ with previous data obtained by resource usage tracking. Depending on the data obtained by resource usage tracking, the resultant trained algorithm may classify resource usage in terms of the manner in which the user will use resources 250 generally and or in terms of which specific resources 250 the user will use.

The machine learning may also be unsupervised, such as clustering in the parameter space 124, for example K-means clustering in the parameter space 124.

The machine learning can be implemented by a pretrained algorithm or by a dynamically updated algorithm.

In some examples the method 100 comprises further classifying the expected usage with respect to its expected impact on the wellbeing of the user.

In this example, the initiation of the change in the access task 240 between first and second times that the user seeks access to the at least one resource 250 is responsive to a determination that the expected usage at the second time has a different expected impact on the wellbeing of the user to that of the expected usage at the first time.

The expected impact can be determined from a lookup table of predefined impact scores for different resource usages. The impact scores may personalized for the user. In some examples the personalized impact scores are defined by the user and in other examples the personalized impact scores are learnt from user behavior over time.

In some examples, the impact scores in the lookup table also vary with total resource usage time within a preceding period. For example, the user may set a target usage limit of one hour per day for the at least one resource 250. As the user approaches that time, the impact scores may decrease and become negative at least once the limit is reached. Additionally, during a user's defined or learnt work hours, resources 250 which do not relate to the user's work may have a negative impact score, whereas out of work hours, the wellbeing score may be higher.

The change in the access task 240 between first and second times that the user seeks access to the at least one resource 250 may be initiated if the expected usage at the second time has a different impact score in the lookup table to that of the expected usage at the first time.

In some examples, the initiated change in the access task 240 is one which produces a resultant access task 240 which is more or less sensitive to differences in the cognitive control state of the user. An access task 240 which is more sensitive to differences in the cognitive control state of the user can be one in which the differences in the manner in which the access task 240 is performed by focused and unfocused users is emphasized. Accordingly, greater focus is required to complete such an access task 240 to thereby gain access to the resources that it protects. An access task 240 which is less sensitive to differences in the cognitive control state of the user will require less focus and may therefore be easier to perform.

When a determined expected usage relates to, for example:
  absent-minded, and therefore unhealthy, usage of the at least one resource 250; or usage of one or more resources 250 which employ technical measures to gain the attention of the user and to distract them from other activities,
restricting access to said resources 250 unless the user demonstrates that they are in a high cognitive control state can reduce the time spent by the user interacting with these resources 250. When in a high cognitive control state, the user is more likely to use the at least one resource 250 to which they are granted access a focused manner and thus spend less time interacting with the at least one resource 250.

This can be achieved by initiating a change in the access task 240 to an access task 240 which is more sensitive to differences in the cognitive control state of the user in response to determining such expected usage.

Outside of such expected usage, distinguishing between the cognitive control state of the user may not be a priority. The ease by which the user may obtain access to the at least one resource 250 may take priority. In this case, a change in the access task 240 is initiated which produces a resultant access task 240 which is less sensitive to differences in the cognitive control state of the user and is thus easier to complete for an unfocused user.

The method 100 may also comprise determining a confidence score for the accuracy of the expected usage and the change in the access task 240 may not be initiated in the event of low confidence in the accuracy of the expected usage. For example, if it is 7 pm on a weekday, the user is at home, and 9 out of 10 times in the past the user has used the at least one resource 250 in a particular manner in similar circumstances then there may be 90% confidence that the user will use the at least one resource 250 in the same manner this time.

The initiation of a change in the access task 240 which produces a resultant access task 240 which is more sensitive to differences in the cognitive control state of the user may be overridden in instances where a predicted tolerance of the user to such change is low. A predicted tolerance of the user to the change in the access task 240 can be based on past resource usage, current circumstances, and user-specified rules such as, for example, lower tolerance when at the user's workplace and higher tolerance when at the user's home.

In other examples, the initiated change in the access task 240 is one which produces a resultant access task 240 which is more contextually appropriate or compensates for difficulty induced by adverse conditions. For example, a visual search-based access task (such as, for example, an image identification captcha) may be made more challenging by light conditions that produce screen glare and in such conditions a change in the access task 240 may be initiated to either simplify the visual search-based access task or to switch to another type of access task. As another example, facial recognition may be less accurate in poor light conditions and in such conditions a change in the access task 240 may be initiated to switch to another type of access task.

FIG. 3 schematically illustrate an example of an apparatus 200 that is suitable for performing the method 100.

The apparatus 200 comprises a controller 202.

In this example, the controller 202 comprises an access control module 212 configured to control whether or not a user 300 is granted access 232 to at least one resource 250 based on an obtained response 230 of the user to an access task 240. The controller 202 also comprises a restriction control module 214 configured to set one or more restrictions 234 on granted access 232 to the at least one resource 250 based on the obtained response 230 of the user 300 to the access task 240.

In this example, the controller 202 additionally comprises a task control module 222 configured to initiate a change 236 in the access task 240 such that the user 300 is faced with a first access task to respond to at a first time and is them faced with a second, different access task to respond to at a second time. The initiation of the change 236 is causally independent of the obtained response 230 of the user to the first access task as described above.

The controller 202 may be provided by any suitable hardware or circuitry. The modules 212, 214, 222 may be hardware modules of the controller 202 or may be functional modules of the controller 202 and can be enabled by firmware or software. For example, in some implementations the controller 202 is a processor, for example a central processing unit running an operating system. The modules 212, 214, 222 represent functionality provided by the operating system when run on the processor.

In some examples the apparatus 200 further comprises the at least one resource 250 with which a user 300 can interact when granted access 232 by the controller 202. The apparatus 200 can be additionally configured to render the access task 240 to the user 300 and to obtain the response 230 of the user 300 to the access task 240 either by receive user input from which a response of the user 300 to the access task 240 can be obtained, either directly or by means of processing the received user input or by measuring parameters which parameterize the response 230 of the user 300. Examples of such parameters may comprise a fixation position of a gaze of the user as described in relation to FIGS. 5 and 6 below.

For example, the apparatus 200 may be configured as or comprised in a device such as a smartphone or tablet.

In this example, the at least one resource 250 comprises device system resources such as device hardware or device system software including the operating system and/or application software resources that can be run on the device.

In this example, the device may be configured to render the access task 240 to the user 300. Rendering the access task 240 puts the access task 240 into a format in which it can be perceived by the user 300. The access task 240 can be rendered to the user 300 as a visual output from a display of the device, as an audio output from a speaker of the device, or as another perceptible output from another user interface of the device. These means for rendering the access task 240 to the user 300 can also be configured to enable interaction between the user 300 and the at least one resource 250 in the event of granted access 232.

In this example, the device can also comprise sensors configured to receive user input from the user 300 from which the response 230 of the user 300 to the access task 240 can be obtained or to otherwise measure parameters which parameterize the response 230 of the user 300.

FIGS. 4A to 4C schematically illustrate examples of different access tasks $240_1$, $240_2$, $240_3$. In these examples, the type of access task remains the same but the parameters of the access task change.

In these examples the access tasks $240_1$, $240_2$, $240_3$ are all a type of visual search-based task. The access tasks $240_1$, $240_2$, $240_3$ comprise one or more target element $T_1$ to $T_3$ rendered to the user 300 for identification by the user 300. In each case, successful identification of the one or more target elements $T_1$ to $T_3$ by the user 300 completes the access tasks $240_1$, $240_2$, $240_3$. In some examples, completing the access tasks access tasks $240_1$, $240_2$, $240_3$ requires the user 300 to successfully identify the one or more target elements $T_1$ to $T_3$ in a prescribed order. For example, the one or more target elements $T_1$ to $T_3$ may be a set of numbers from a rendered grid of numbers and the access task 240 may be to input a PIN code comprising the set of numbers in a prescribed order.

The access tasks $240_1$, $240_2$, $240_3$ differ in respect of one or more distractor elements $D_1$ to $D_6$ which are rendered to the user.

In these examples, the one or more target elements $T_1$ to $T_3$ and one or more distractor elements $D_1$ to $D_6$ are graphical elements which are rendered to the user 300 by means of a display 242. In other examples the one or more target elements $T_1$ to $T_3$ and one or more distractor elements $D_1$ to $D_6$ can be rendered as audio via, for example, a loud speaker. Rendering either of the one or more target elements $T_1$ to $T_3$ and one or more distractor elements $D_1$ to $D_6$ puts these elements into a format in which they can be perceived by the user 300.

The change 236 in the access task 240, as initiated in accordance with block 122 of the second sub-method 120, comprises changing one or more of: a ratio; a proximity; a similarity (in, for example, shape, size and/or color); and a relative movement, of the one or more distractor elements $D_1$ to $D_6$ to the one or more target elements $T_1$ to $T_3$.

In access task $240_1$, as schematically illustrated in FIG. 4A, only target elements $T_1$ to $T_3$ are rendered to the user. No distractor elements are rendered to the user 300.

In access task $240_2$, as schematically illustrated in FIG. 4B, distractor elements $D_1$, $D_2$ are rendered to the user 300 in addition to the target elements $T_1$ to $T_3$.

In access task $240_3$, as schematically illustrated in FIG. 4C, distractor elements $D_3$ to $D_6$ are rendered to the to the user 300 in addition to the target elements $T_1$ to $T_3$.

The distractor elements $D_3$ to $D_6$ of the access task $240_3$ are more numerous, are in closer proximity to, and in some cases are more similar to, the target elements $T_1$ to $T_3$ than the distractor elements $D_1$, $D_2$ of the access task $240_2$. As a result, it is harder for the user 300 to distinguish between the target elements $T_1$ to $T_3$ and the distractor elements $D_3$ to $D_6$ than it is for the user to distinguish between the target elements $T_1$ to $T_3$ and the distractor elements $D_1$, $D_2$. It is therefore easier to focus attention on the distractor elements $D_3$ to $D_6$ and hence to be distracted during the access task $240_3$ of FIG. 4C. The differences in the response 230 of the user 300 when they are more susceptible to distraction (i.e., in a lower cognitive control state) and the response 230 of the user 300 when they are less susceptible to distraction (i.e., in a higher cognitive control state) is emphasized by the access task $240_3$ of FIG. 4C as compared to the access task $240_2$ of FIG. 4B. The access task $240_3$ of FIG. 4C is more sensitive to differences in the cognitive control state of the user 300.

An access task 240 with a greater ratio, proximity, similarity, and/or relative movement, of distractor elements to target elements is more sensitive to differences in the cognitive control state of the user 300. An access task 240 with a lower ratio, proximity, similarity, and/or relative movement, of distractor elements to target elements is less sensitive to differences in the cognitive control state of the user 300.

The parameters of the access task 240 that is provided to the user 300 when the user 300 seeks access to the at least one resource 250 can be based on the expected usage (as described in relation to FIG. 2 above) at the time when the user 300 seeks access to the at least one resource 250. For example, parameters such as: a ratio, a proximity, a similarity, and/or a relative movement, of the one or more distractor elements $D_1$ to $D_6$ to the one or more target elements $T_1$ to $T_3$ can be based on the expected usage at the time when the user 300 seeks access to the at least one resource 250. In these examples, the task control module 222 is configured to determine these parameters.

The value of the parameters of the access task 240 can be determined by using the expected usage to query a lookup table of preset values which enable a suitably sensitive assessment of the cognitive control state of the user in view of the expected usage. The preset values may consist of acceptable ranges, where exact values of the parameters of the access task 240 may be sequentially, randomly or otherwise assigned within the range so that the access task 240 varies for different occasions when the user 300 seeks access to the at least one resource 250 via the access task 240 even when the expected usage remains the same. Therefore, the access task 240 cannot by learnt by the user 300.

The one or more distractor elements $D_1$ to $D_6$ can be designed to resemble graphical icons of a plurality of resources 250 and the salience of the fixation of the gaze of the user on one or more of these graphical icons may be used to acquire further information about the expected usage.

In some examples, identifying the one or more target elements $T_1$ to $T_3$ comprises identifying the location of these elements within the display 242. This can be achieved by gaze tracking as illustrated in FIG. 5.

In this example a camera 244, for example a front-facing camera mounted proximate the display 242 and comprised in the apparatus 200, observes the eyes 302 of the user 300. Gaze tracking data obtain by the camera 244 is processed to determine fixation positions 304 of the gaze of the user 300 as a function of time. A fixation position 304 is determined when the gaze of the user 300 is focused on a series of closely clustered (in both time and space) points.

FIG. 5 illustrates two fixation positions 304—one which matches a rendered position of a target element $T_1$ and one which matches a rendered position of a distractor element $D_2$.

FIG. 6 schematically illustrates an example of obtaining the response 230 of the user 300 from the apparatus 200 of FIG. 5.

In this example the fixation positions 304 of the gaze of the user 300 as a function of time and the rendered positions $246_T$ of the one or more target elements $T_1$ to $T_3$ are compared, at the apparatus 200, to determine when a fixation position 304 of the gaze of the user 300 matches a rendered position $246_T$ of the one or more target elements $T_1$ to $T_3$. The matching of a fixation position 304 of the gaze of the user 300 with a rendered position $246_T$ of one of the target elements $T_1$ to $T_3$ can be considered as identification of that target element.

A fixation duration on the one or more target elements $T_1$ to $T_3$ can be determined from a duration of matches between the fixation positions 304 of the gaze of the user 300 and the rendered positions $246_T$ of the one or more target elements $T_1$ to $T_3$.

Where the target elements $T_1$ to $T_3$ are dynamic rather than static, positions $246_T$ of the one or more target elements $T_1$ to $T_3$ are also expressed as a function of time.

The obtained response 230 of the user 300 to the access task 240 can be based on a total time taken to identify all of the one or more target elements $T_1$ to $T_3$, and thus to complete the access task 240. For example, the obtained response 230 of the user 300 to the access task 240 can be based on a total time taken for fixation positions 304 of the gaze of the user 300 to have matched with the rendered positions $246_T$ of all of the one or more target elements $T_1$ to $T_3$.

The obtained response 230 of the user 300 to the access task 240 can additionally or alternatively be based on elapsed time between new identifications of previously unidentified ones of the target elements $T_1$ to $T_3$.

Alternatively, the obtained response 230 of the user 300 to the access task 240 can be based on a fixation duration on the one or more target elements $T_1$ to $T_3$ and/or a frequency at which the fixation position 304 of the gaze of the user 300 matches the rendered positions $246_T$ of the one or more target elements $T_1$ to $T_3$.

In some, but not necessarily all, examples the fixation positions 304 of the gaze of the user 300 as a function of time can also be compared to the rendered positions $246_D$ of the one or more distractor elements $D_1$ to $D_6$ to determine when the fixation position 314 of the gaze of the user 300 matches a rendered position $246_D$ of the one or more distractor elements $D_1$ to $D_6$.

A fixation duration on the one or more distractor elements $D_1$ to $D_6$ can be determined from a duration of matches between the fixation positions 304 of the gaze of the user 300 and the rendered positions $246_D$ of the one or more distractor elements $D_1$ to $D_6$.

Where the distractor elements $D_1$ to $D_6$ are dynamic rather than static, positions $246_D$ of the one or more distractor elements $D_1$ to $D_6$ are also expressed as a function of time.

In one example the obtained response 230 of the user 300 to the access task 240 is determined from a ratio of the fixation duration on the one or more target elements $T_1$ to $T_3$ to the fixation duration on the one or more distractor elements $D_1$ to $D_6$.

In another example the obtained response 230 of the user 300 to the access task 240 is determined from a frequency at which a fixation position 304 of the gaze of the user 300 changes from matching the rendered position $246_T$ of the one or more target elements $T_1$ to $T_3$ to matching the rendered position $246_D$ of the one or more distractor elements $D_1$ to $D_6$.

FIG. 6 can be implemented by a gaze processing module forming part of the controller 202 or associated with the camera 244. This gaze processing module receives as inputs: the fixation positions 304 of the gaze of the user 300 as a function of time; the rendered positions $246_T$ of the one or more target elements $T_1$ to $T_3$; and the rendered positions $246_D$ of the one or more distractor elements $D_1$ to $D_6$. This gaze processing module outputs the obtained response 230 of the user 300 to the access task 240 towards the access control module 212 and the restriction control module 214.

Different responses 230 of a user 300 to an access task 240 result in different levels of access for the user 300 to the at least one resource 250.

Figure 7A:
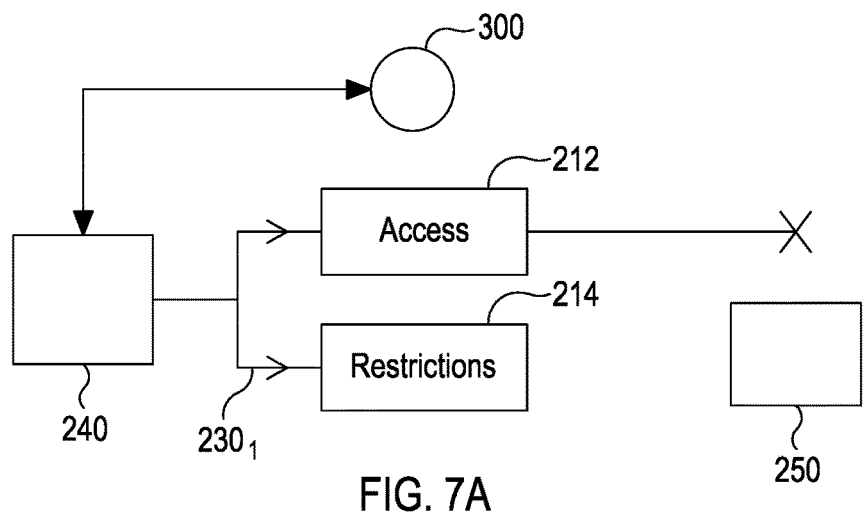
FIGS. 7A to 7C show examples of different responses as described herein.
Figure 7B:
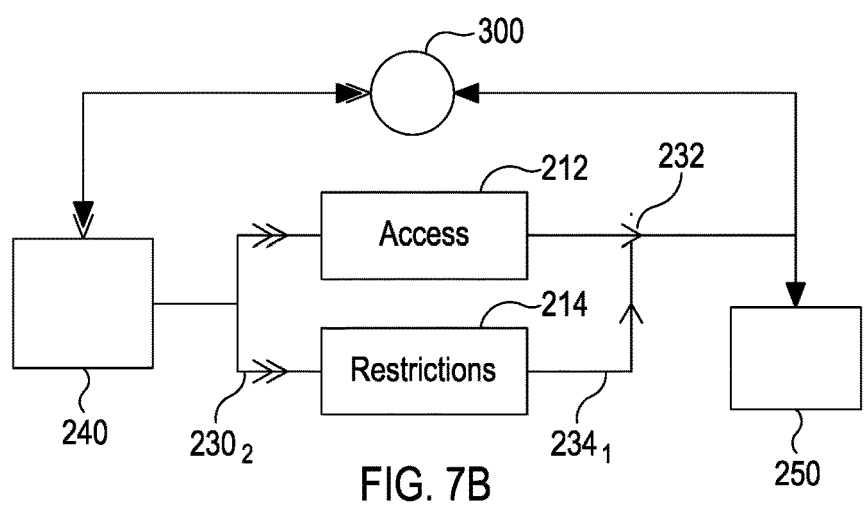
Figure 7C:
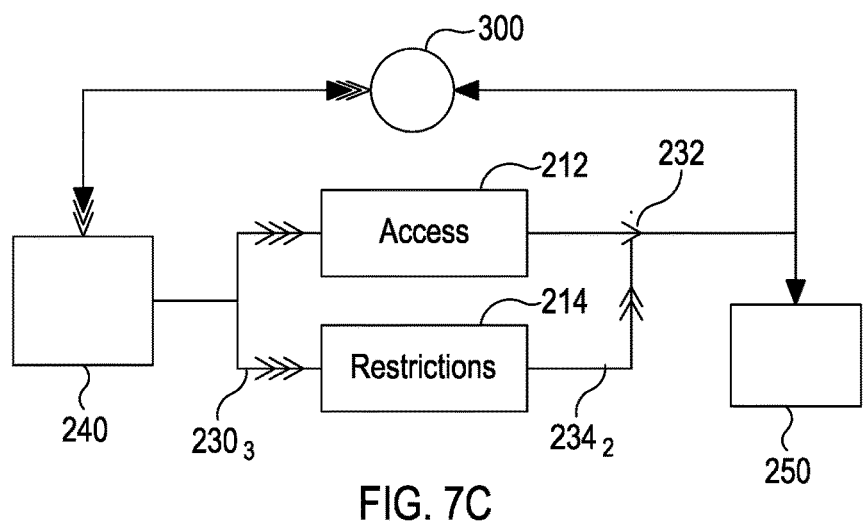

FIGS. 7A to 7C schematically illustrate different responses 230 of the user 300 to an access task 240 and the resultant access for the user 300 to the at least one resource 250.

In the example of FIG. 7A, a response $230_1$ of the user 300 falls within a first class of responses. In this example the first class of responses corresponds to the user 300 failing to complete the access task 240. In accordance with block 112 of the first sub-method 110, access to the at least one resource 250 is prevented based on the failure of the user 300 to complete the access task 240.

In the example of FIG. 7B, a response $230_2$ of the user 300 to the access task 240 falls within a second class of responses. In this example the second class of responses correspond to a situation in which the user 300 completes the access task 240 and, in doing so, demonstrates that they are in a low cognitive control state. For example, the user 300 may have required repeated attempts before completing the access task 240 or may have taken a long time to complete the access task 240. In this example, since the user 300 has completed the access task 240, the user 300 is granted access 232 to the at last one resource 250. Based on the response $230_2$, first one or more restrictions $234_1$ are set on the granted access 232 to the at last one resource 250.

In the example of FIG. 7C, a response $230_3$ of the user 300 to the access task 240 falls within a third class of responses. In this example, the third class of responses correspond to a situation in which the user 300 completes the access task and, in doing so, demonstrates that they are in a moderate cognitive control state. Like the example of FIG. 7B, the user 300 is granted access 232 to the at least one resource 250 since they have completed the access task 240. In this example, however, second one or more restrictions $234_2$ on the granted access 232 are set, the second one or more restrictions $234_2$ being different to the first one or more restrictions $234_1$. Since the response $230_3$ of the user 300 in this example demonstrates that the user is in a higher cognitive control state than they were in in the example of FIG. 7B, the second one or more restrictions $234_2$ on the granted access 232 are lighter than the first one or more restrictions $234_1$. The granted access 232 for the user 300 to the at last one resource 250 is less restricted in the example of FIG. 7C than in the example of FIG. 7B.

Responses 230 of the user 300 to the access task 240 can be explicitly classified according to, for example, a specified algorithm or rules such as a lookup table or according to, for example, an unspecified algorithm resulting from supervised machined learning using classified past responses as training data (classification). Alternatively, responses 230 of the user 300 to the access task 240 can be implicitly classified according to, for example, an unspecified algorithm from unsupervised machined learning using unlabeled past responses as training data (clustering).

It is to be understood that there may be more than three classes of response and that classes which indicate that the user is in a sufficiently high cognitive control state may result in granted access 232 for the user 300 to the at last one resource 250 which is unrestricted.

FIGS. 8A and 8B and FIGS. 9A to 9C schematically illustrate examples of the one or more restrictions 234 on the granted access 232 which are set in accordance with block 114 of the first sub-method 110.

Figure 8A:
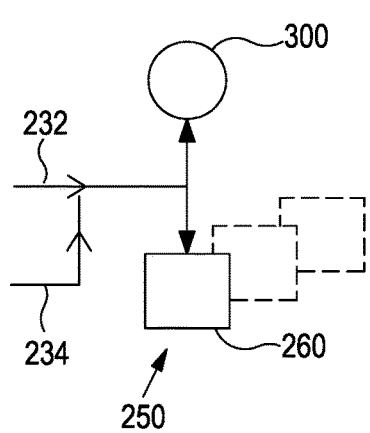
FIGS. 8A and 8B show examples of restrictions on granted access as described herein.
Figure 8B:
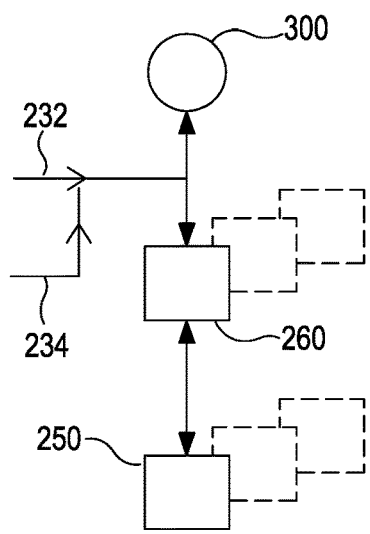

In the examples of FIGS. 8A and 8B, setting one or more restrictions 234 on granted access 232 comprises controlling one or more settings of at least one system resource 260.

In the example of FIG. 8A, the at least one resource 250 to which access is controlled by the controller 202 is the at least one system resource 260.

In the example of FIG. 8B, the at least one system resource 260 is an intermediate component in a chain of communication between the user 300 and the at least one resource 250 to which the user 300 seeks access. The at least one system resource 260 therefore enables the user to interact with the at least one resource 250. The at least one resource 250 may be an application software resource which the user 300 can interact with via the at least one system resource 260.

In either example, controlling one or more settings of the at least one system resource 260 in order to restrict granted access 232 can comprise controlling one or more settings to reduce performance of the at least one system resource 260. For example, where the at least one system resource 260 comprises a processor, the processing speed can be throttled, or where the at least one system resource 260 comprises a display driver, the color palette can be reduced, for example from full-color to greyscale.

The reduction in performance of the at least one system resource 260 discourages continued usage of the at least one resource 250.

Alternatively, controlling one or more settings of the at least one system resource 260 in order to restrict granted access 232 can comprise controlling one or more settings to improve the wellbeing of the user 300. For example, a bluelight filter may be applied or screen brightness reduced.

The lower the cognitive control state of the user 300 is when they are granted access 232 to the at least one resource, the higher the likelihood of the user getting distracted and spending a prolonged time interacting with the at least one resource 250. Rather than discouraging continued usage, by controlling one or more settings of the at least one system resource 260 improve the wellbeing of the user 300, the detrimental effects of prolonged usage as discussed above can be ameliorated.

Figure 9A:
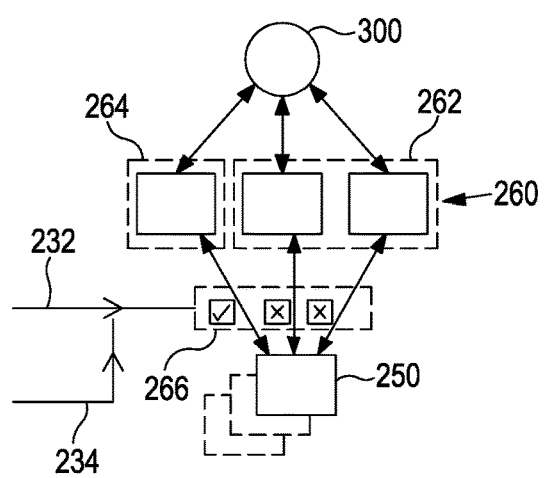
FIGS. 9A to 9C show other examples of restrictions on granted access as described herein.
Figure 9B:
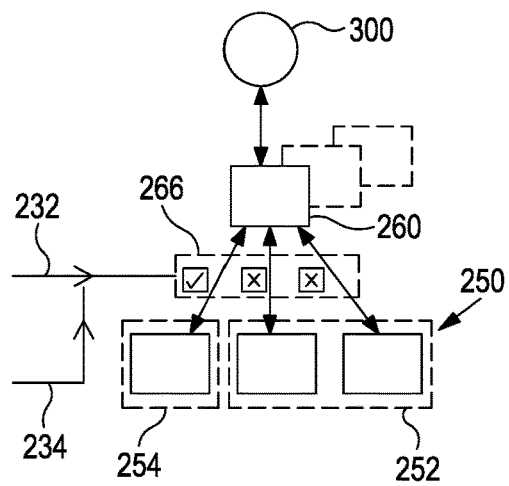
Figure 9C:
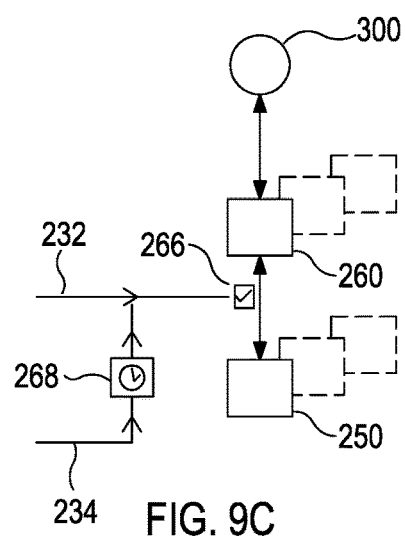

In the examples of FIGS. 9A to 9C, setting one or more restrictions 234 on granted access 232 comprises controlling one or more permissions 266 of the at least one resource 250 to system resources 260 via which the user 300 can interact with the at least one resource 250. The at least one resource 250 may be an application software resource which the user 300 can interact with via the at least one system resource 260.

In the example of FIG. 9A, the one or more restrictions 234 on the granted access 232 comprise reducing permissions 266 of the at least one resource 250 to system resources 260 via which the user 300 can interact with the at least one resource 250. In this example, the at least one resource 250 is denied permission to a first subset 262 of the system resources 260 and granted permission to a second subset 264 of the system resources 260. Different one or more restrictions 234 alter the first and second subsets 262, 264. First one or more restrictions $234_1$ cause permission of the at least one resource 250 to a particular system resource 260 to be denied while second one or more restrictions $234_2$ do not deny permission of the at least one resource 250 to that particular system resource 260. Therefore, under second one or more restrictions $234_2$, the granted access 232 enables interaction between the user 300 and the at least one resource via that particular system resource 260.

In an illustrative example, the user 300 may be provided restricted access to an application in so far as the user 300 can run the application, however the application may be denied permission to a notification system and thus cannot engage the attention of the user via rendering notifications to the user 300 and/or denied permission to an audio rendering system and thus cannot engage the attention of the user via audio rendered to the user 300.

In the example of FIG. 9B, the one or more restrictions 234 on the granted access 232 comprise reducing permissions 266 of a first or a first subset 252 of a plurality of resources 250 to at least one system resource 260 wherein a second or a second subset 254 (which may constitute the remainder) of the plurality of the resources 250 are granted permission to the at least one system resource 260. In some examples, the user 300 is only granted access to a subset 254 of a plurality of resources 250, wherein in the absence of the one or more restrictions 234, the plurality of resources 250 would have been accessible to the user 300.

In an illustrative example, permission to run social applications using a processor may be denied whilst productivity applications can be run by the processor. The user 300 is thereby granted access to the productivity applications but denied access to the social applications by means of the one or more restrictions 234 set on the granted access 232. More generally, setting one or more restrictions 234 on granted access 232 may comprise granting access for the user to at least one of a plurality of resources 250 and denying access for the user to at least one other of the plurality of resources 250.

It should be noted that in some examples the one or more permissions 266 of separate ones of the plurality of resources 250 may be independently controlled in relation to separate ones of a plurality of system resources 260 via which the user 300 can interact with the resources 250.

The permissions 266 can be obtained from a permissions lookup table. In this example the permissions lookup table is an array having different dimensions spanned by: different properties that resources 250 may have; the identity of the plurality of system resources 260; and the classification of responses to the access task 240.

The first and second subsets 262 and 264 of the system resources 260 can be determined by querying the permissions lookup table using the determined classification of the response of the user 300 to the access task 240 and known properties of the at least one resource 250. Such a query returns the permissions 266 to different ones of the plurality of system resources 260. Those system resources 260 to which permission is denied form the first subset 262 and those system resources 260 to which permission is not denied form the second subset 264.

The first and second subsets 252 and 254 of the plurality of resources 250 can be determined by querying the permissions lookup table using the determined classification of the response of the user 300 to the access task 240 and the identity of the at least one system resource 260. Such a query returns the permissions 266 indexed by properties that resources 250 may have. The first and second subsets 252 and 254 are then based on the properties of different ones of the plurality of resources 250.

The properties of the at least one resource 250 may include, for example: purpose such as productivity, entertainment, education, etc.; contextual associations such as work or recreation; distractive potential which may be personalized for the user 300 or not. These properties may be pre-defined by the resource creator, determined from previous resource usage, or specified by the user 300.

In the example of FIG. 9C, the one or more restrictions 234 on the granted access 232 comprise a time limit 268 on one or more permissions 266 of the at least one resource 250 to at least one system resource 260 via which the user 300 can interact with the at least one resource 250. The time limit 268 may be a limit of a time period beginning with the granted access 232 or may be a limit on a duration of interaction between the user 300 and the at least one resource 250 during a given time period following the granted access 232.

In an illustrative example, permission to run an application using a processor may be granted until the time limit 268 expires and then said permission is denied. Therefore, in effect, the one or more restrictions 234 set a time limit 268 on the granted access 232.

It should be noted that in some examples the time limits 268 in respect of the permissions 266 of different resources 250 to different system resources 260 may be independently controlled.

In other examples, setting one or more restrictions 234 on granted access 232 comprises enabling or disabling one or more functions, processes or threads of the at least one resource 250. Analogously to the example one or more restrictions 234 of FIGS. 9A to 9C, the one or more restrictions 234 may:

prevent the at least one resource 250 from executing one or a subset of functions, processes or threads, wherein in the absence of the one or more restrictions 234, the at least one resource 250 would have been able to execute the one or a subset of functions, processes or threads; and/or set a time limit on when the at least one resource 250 is able to execute one or a subset of functions, processes or threads.

Although in the foregoing the different one or more restrictions 234 on the granted access 232 have been described as separate examples, it is to be appreciated that these one or more restrictions 234 may be combined and implemented concurrently.

Figure 10:
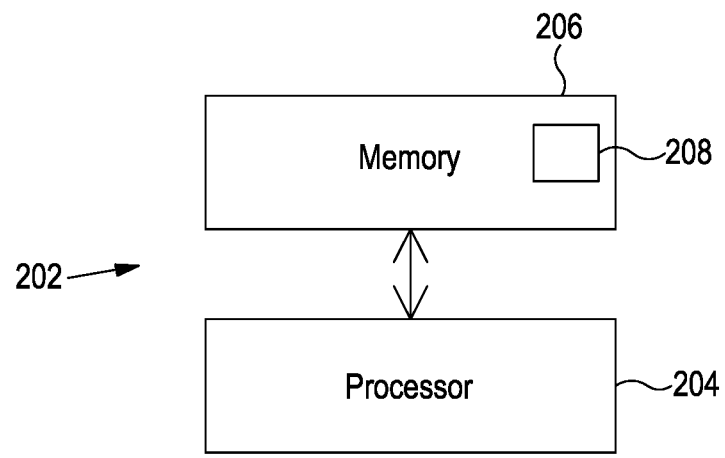
FIG. 10 shows an example of a controller as described herein.

FIG. 10 illustrates an example of the controller 202. Implementation of the controller 202 may be as controller circuitry. The controller 202 may be implemented in hardware alone, have certain aspects in software including firmware alone or can be a combination of hardware and software (including firmware).

As illustrated in FIG. 10 the controller 202 may be implemented using instructions that enable hardware functionality, for example, by using executable instructions of a computer program 208 in a general-purpose or special-purpose processor 204 that may be stored on a computer readable storage medium (disk, memory, etc.) to be executed by such a processor 204.

The processor 204 is configured to read from and write to the memory 206. The processor 204 may also comprise an output interface via which data and/or commands are output by the processor 204 and an input interface via which data and/or commands are input to the processor 204.

The memory 206 stores a computer program 208 comprising computer program instructions (computer program code) that controls the operation of the apparatus 200 when loaded into the processor 204. The computer program instructions, of the computer program 208, provide the logic and routines that enables the apparatus 200 to perform the methods illustrated in the FIGS. The processor 204 by reading the memory 206 is able to load and execute the computer program 208.

The apparatus 200 therefore comprises:

at least one processor 204; and at least one memory 206 including computer program code the at least one memory 206 and the computer program code configured to, with the at least one processor 204, cause the apparatus 200 at least to perform:

at a first time:

controlling whether or not a user 300 is granted access 232 to at least one resource 250 based on an obtained response 230 of the user 300 to a first access task, and setting one or more restrictions 234 on granted access 232 to the at least one resource 250 based on the obtained response 230 of the user 300 to the first access task, at a second time:

controlling whether or not a user 300 is granted access 232 to at least one resource 250 based on an obtained response 230 of the user 300 to a second access task, different to the first access task, and setting one or more restrictions 234 on granted access 232 to the at least one resource 250 based on the obtained response 230 of the user 300 o the second access task; and initiating a change 236 from the first access task to the second access task, wherein the initiation of the change 236 is causally independent of the obtained response 230 of the user 300 to the first access task.

Figure 11:
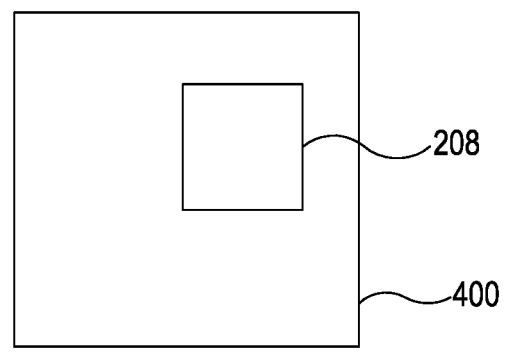
FIG. 11 shows an example of a delivery mechanism as described herein.

As illustrated in FIG. 11, the computer program 208 may arrive at the apparatus 200 via any suitable delivery mechanism 400. The delivery mechanism 400 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 208. The delivery mechanism may be a signal configured to reliably transfer the computer program 208. The apparatus 200 may propagate or transmit the computer program 208 as a computer data signal.

Computer program instructions that when run on a processor cause an apparatus to perform at least the following or enable at least the following:
at a first time:
controlling whether or not a user 300 is granted access 232 to at least one resource 250 based on an obtained response 230 of the user 300 to a first access task, and
setting one or more restrictions 234 on granted access 232 to the at least one resource 250 based on the obtained response 230 of the user 300 to the first access task,
at a second time:
controlling whether or not a user 300 is granted access 232 to at least one resource 250 based on an obtained response 230 of the user 300 to a second access task, different to the first access task, and
setting one or more restrictions 234 on granted access 232 to the at least one resource 250 based on the obtained response 230 of the user 300 o the second access task; and
initiating a change 236 from the first access task to the second access task, wherein the initiation of the change 236 is causally independent of the obtained response 230 of the user 300 to the first access task.

The computer program instructions may be comprised in a computer program, a non-transitory computer readable medium, a computer program product, a machine readable medium. In some but not necessarily all examples, the computer program instructions may be distributed over more than one computer program.

Although the memory 206 is illustrated as a single component/circuitry it may be implemented as one or more separate components/circuitry some or all of which may be integrated/removable and/or may provide permanent/semi-permanent/ dynamic/cached storage.

Although the processor 204 is illustrated as a single component/circuitry it may be implemented as one or more separate components/circuitry some or all of which may be integrated/removable. The processor 204 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS may represent steps in a method and/or sections of code in the computer program 208. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The algorithms hereinbefore described may be applied to achieve the following technical effects: access control (for the user 300 to the at least one resource250) and system resource 270 allocation (for the at least one resource 250).

The above described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code,
   the at least one memory and the computer program code configured to, with the at least one processor, cause the apparatus at least to perform:
   at a first time:
   controlling whether or not a user is granted access to at least one resource based on an obtained response of the user to a first access task, and
   setting one or more restrictions on granted access to the at least one resource based on the obtained response of the user to the first access task,
   at a second time:
   controlling whether or not the user is granted access to the at least one resource based on an obtained response of the user to a second access task, different to the first access task, and
   setting one or more restrictions on granted access to the at least one resource based on the obtained response of the user to the second access task;
   obtaining an expected usage of the at least one resource at the first time and at the second time based on one or more values of the one or more monitored parameters at the first and second time, respectively, which vary with actions of the user, and wherein the one or more monitored parameters comprises one or more of (i) a time of day the user attempts to access the at least one resource, (ii) a physical location of the user when the user attempts to access the at least one resource, or (iii) biometric parameters indicative of one or more of a mood or behavior of the user; and
   initiating a change from the first access task to the second access task, wherein the initiation of the change is causally independent of the obtained response of the user to the first access task, wherein the initiation of the change from the first access task to the second access task occurs in response to a change, occurring between the first and second times, in the one or more values of the one or more monitored parameters, and from the first access task to the second access task if the expected usage at the second time is different to the expected usage at the first time.

2. The apparatus of claim 1 wherein setting one or more restrictions on granted access comprises controlling one or more permissions of the at least one resource to at least one system resource via which the user can interact with the at least one resource.

3. The apparatus of claim 1 wherein setting one or more restrictions on granted access comprises granting access for the user to at least one of a plurality of resources and denying access for the user to at least one other of the plurality of resources.

4. The apparatus of claim 1 wherein setting one or more restrictions on granted access to the at least one resource comprises setting a time limit on the granted access.

5. The apparatus of claim 1 wherein setting one or more restrictions on granted access to the at least one resource comprises controlling settings of at least one system resource via which the user can interact with the at least one resource.

6. The apparatus of claim 1 wherein the first and second access task comprise rendering one or more target elements rendered to the user for identification by the user.

7. The apparatus of claim 6 wherein the first access task differs from the second access task in respect of one or more distractor elements rendered to the user.

8. The apparatus of claim 7 wherein the change from the first access task to the second access task comprises changing one or more of: a ratio; a proximity; a similarity; or a relative movement, of the one or more distractor elements to the one or more target elements.

9. The apparatus of claim 6 wherein the at least one memory and the computer program code are configured to, with the at least one processor, cause the apparatus at least to further perform:
obtaining gaze-tracking data of the user; and
determining when a fixation position of a gaze of the user matches a rendered position of the one or more target elements,
wherein the obtained response of the user to the first and/or second access task is based on a duration and/or frequency of the fixation position of the gaze of the user matching the rendered position of the one or more target elements.

10. The apparatus of claim 1 wherein the at least one memory and the computer program code are configured to, with the at least one processor, cause the apparatus at least to further perform:
preventing access to the at least one resource if the determined response of the user is within a first class of responses;
setting first one or more restrictions on granted access to the at least one resource if the determined response of the user is within a second class of responses; and
setting second one or more restrictions, different to the first restrictions, on granted access to the at least one resource if the measured response of the user is within a third class of responses.

11. The apparatus of claim 1 wherein the at least one memory and the computer program code are configured to, with the at least one processor, cause the apparatus at least to further perform:
classifying the obtained response of the user to the first and/or second access task;
controlling whether or not a user is granted access to at least one resource based on a classification of the determined response of the user; and
setting one or more restrictions on granted access to the at least one resource based on the classification of the determined response of the user.

12. The apparatus of claim 1, wherein the obtained response of the user to the first access task and the second access task is based on gaze-tracking data.

13. A method comprising:
at a first time:
controlling whether or not a user is granted access to at least one resource based on an obtained response of the user to a first access task, and
setting one or more restrictions on granted access to the at least one resource based on the obtained response of the user to the first access task, at a second time:
controlling whether or not the user is granted access to the at least one resource based on an obtained response of the user to a second access task, different to the first access task, and
setting one or more restrictions on granted access to the at least one resource based on the obtained response of the user to the second access task;
obtaining an expected usage of the at least one resource at the first time and at the second time based on one or more values of the one or more monitored parameters at the first and second time, respectively, which vary with actions of the user, and wherein the one or more monitored parameters comprises one or more of (i) a time of day the user attempts to access the at least one resource, (ii) a physical location of the user when the user attempts to access the at least one resource, or (iii) biometric parameters indicative of one or more of a mood or behavior of the user; and
automatically initiating a change from the first access task to the second access task, wherein the initiation of the change is causally independent of the obtained response of the user to the first access task, wherein the initiation of the change from the first access task to the second access task occurs in response to a change, occurring between the first and second times, in the one or more values of the one or more monitored parameters, and from the first access task to the second access task if the expected usage at the second time is different to the expected usage at the first time.

14. The method of claim 13 wherein setting one or more restrictions on granted access comprises controlling one or more permissions of the at least one resource to at least one system resource via which the user can interact with the at least one resource.

15. The method of claim 13, wherein the obtained response of the user to the first access task and the second access task is based on gaze-tracking data.

16. A non-transitory computer readable medium comprising program instructions stored thereon for performing at least the following:
at a first time:
controlling whether or not a user is granted access to at least one resource based on an obtained response of the user to a first access task, and
setting one or more restrictions on granted access to the at least one resource based on the obtained response of the user to the first access task, at a second time:
controlling whether or not the user is granted access to the at least one resource based on an obtained response of the user to a second access task, different to the first access task, and
setting one or more restrictions on granted access to the at least one resource based on the obtained response of the user to the second access task;
obtaining an expected usage of the at least one resource at the first time and at the second time based on one or more values of the one or more monitored parameters at the first and second time, respectively, which vary with actions of the user, and wherein the one or more monitored parameters comprises one or more of (i) a time of day the user attempts to access the at least one resource, (ii) a physical location of the user when the user attempts to access the at least one resource, or (iii) biometric parameters indicative of one or more of a mood or behavior of the user; and initiating a change from the first access task to the second access task, wherein the initiation of the change is causally independent of the obtained response of the user to the first access task, wherein the initiation of the change from the first access task to the second access task occurs in response to a change, occurring between the first and second times, in the one or more values of the one or more monitored parameters and from the first access task to the second access task if the expected usage at the second time is different to the expected usage at the first time.

17. The non-transitory computer readable medium of claim 16, wherein the obtained response of the user to the first access task and the second access task is based on gaze-tracking data.

* * * * *